US010697513B2

(12) United States Patent
Arakane

(10) Patent No.: US 10,697,513 B2
(45) Date of Patent: Jun. 30, 2020

(54) BRAKE PAD WEAR DETECTOR

(71) Applicant: ADVICS CO., LTD., Kariya-shi, Aichi-ken (JP)

(72) Inventor: Shohei Arakane, Nagakute (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 0 days.

(21) Appl. No.: 15/559,313

(22) PCT Filed: Mar. 31, 2016

(86) PCT No.: PCT/JP2016/060823
§ 371 (c)(1),
(2) Date: Sep. 18, 2017

(87) PCT Pub. No.: WO2016/159311
PCT Pub. Date: Oct. 6, 2016

(65) Prior Publication Data
US 2018/0112732 A1    Apr. 26, 2018

(30) Foreign Application Priority Data
Mar. 31, 2015    (JP) .................................. 2015-074261

(51) Int. Cl.
*F16D 65/097*    (2006.01)
*F16D 66/02*    (2006.01)
(Continued)

(52) U.S. Cl.
CPC ......... *F16D 66/022* (2013.01); *F16D 65/092* (2013.01); *F16D 65/095* (2013.01); *F16D 66/02* (2013.01); *F16D 66/024* (2013.01)

(58) Field of Classification Search
CPC ............. F16D 65/0972; F16D 65/0978; F16D 65/0006; F16D 66/02; F16D 65/0977
(Continued)

(56) References Cited

U.S. PATENT DOCUMENTS 3,977,499 A * 8/1976 Johannesen ......... F16D 55/2262
188/73.38
4,005,766 A * 2/1977 Kennel ................... F16D 66/02
116/208
(Continued)

FOREIGN PATENT DOCUMENTS

CN         104235239 A    12/2014
DE    102012003325 A1 *  8/2013    ........... F16D 66/024
(Continued)

OTHER PUBLICATIONS

International Search Report (PCT/ISA/210) dated Jun. 28, 2016, by the Japanese Patent Office as the International Searching Authority for International Application No. PCT/JP2016/060823.
(Continued)

*Primary Examiner* — Bradley T King
*Assistant Examiner* — Stephen M Bowes
(74) *Attorney, Agent, or Firm* — Buchanan, Ingersoll & Rooney PC

(57) ABSTRACT

This brake pad wear detector is provided with an attachment part attached to a back plate having a first surface to which a lining in contact with a sliding surface of a disc rotor is secured and a second surface on the side opposite the first surface, an arm part protruding from the attachment part toward the side of the first surface opposite from the second surface, the arm part being curved toward the opposite side, and a contact part provided to the arm part and provided to a position where the contact part will come into contact with the disc rotor when the lining has worn away.

4 Claims, 9 Drawing Sheets

(51) Int. Cl.
*F16D 65/092* (2006.01)
*F16D 65/095* (2006.01)

(58) Field of Classification Search
USPC .................................................. 188/1.11 W
See application file for complete search history.

(56) References Cited

U.S. PATENT DOCUMENTS

| | | | | |
|---|---|---|---|---|
| 4,037,689 | A * | 7/1977 | Maehara | F16D 65/0972 188/1.11 R |
| 4,085,827 | A * | 4/1978 | Kestermeier | F16D 66/02 188/1.11 W |
| 4,124,105 | A * | 11/1978 | Maehara | F16D 65/0972 116/208 |
| 4,498,559 | A * | 2/1985 | Katagiri | F16D 66/02 116/208 |
| 5,033,590 | A * | 7/1991 | Kobayashi | F16D 66/02 188/1.11 W |
| 5,117,947 | A | 6/1992 | Kobayashi et al. | |
| 5,339,928 | A | 8/1994 | Deit | |
| 5,893,434 | A * | 4/1999 | Walker | F16D 66/02 188/1.11 R |
| 2004/0222053 | A1 * | 11/2004 | Wemple | F16D 65/0977 188/73.38 |
| 2005/0077122 | A1 * | 4/2005 | Harris | F16D 66/021 188/71.1 |
| 2011/0168503 | A1 * | 7/2011 | Chelaidite | F16D 65/0972 188/73.31 |
| 2014/0291083 | A1 * | 10/2014 | Bernard | F16D 55/2262 188/250 G |
| 2014/0305754 | A1 * | 10/2014 | Bernard | F16D 65/0972 188/250 E |
| 2014/0345984 | A1 * | 11/2014 | Kamiya | F16D 65/0006 188/73.38 |
| 2014/0367208 | A1 | 12/2014 | Miyake et al. | |

FOREIGN PATENT DOCUMENTS

| | | | | |
|---|---|---|---|---|
| EP | 596761 | A1 * | 5/1994 | ............ F16D 66/02 |
| JP | S52-8950 | B2 | 3/1977 | |
| JP | S56-47923 | U | 4/1981 | |
| JP | H03-118333 | U | 12/1991 | |
| JP | H05196069 | A | 8/1993 | |
| JP | H06022637 | U | 3/1994 | |
| JP | 2014001784 | A | 1/2014 | |
| JP | 2015-1294 | A | 1/2015 | |

OTHER PUBLICATIONS

Notice of Reasons for Refusal in Japanese Patent Application No. 2016-071179 dated Feb. 13, 2020 with English translation, 8 pages.

* cited by examiner

BRAKE PAD WEAR DETECTOR

TECHNICAL FIELD

The present invention relates to a brake pad abrasion detector.

BACKGROUND ART

Conventionally, although a disc brake device mounted on a vehicle generates braking force by pressing a brake pad against a sliding surface of a disc rotor rotating together with a wheel, the lining of the brake pad is abraded (thinned) by repetitive braking operations. Therefore, there is known a brake pad abrasion detector for informing a user that the brake pad (lining) has reached the application limit thereof. For example, there is a back plate supporting a lining has a sensor piece formed by bending a metal plate and fixed thereto. There is a mechanical abrasion detector that generates a warning sound when a distal end part of the sensor piece comes in contact with the disc rotor and vibrates when the lining is abraded (thinned) to the application limit (Patent Literature 1).

CITATION LIST

Patent Literature

Patent Literature 1: Japanese Utility Model Publication No. 3-118333

SUMMARY OF THE INVENTION

Technical Problems

However, in the conventional mechanical abrasion detector, the main body (for example, the spring portion) of the sensor piece protrudes from the surface (cylinder pressing surface) of the back plate opposite to the disc rotor to form a vibrating portion, so that the distal end of the sensor piece faces the disc rotor. Therefore, the abrasion detector must be designed in consideration of interference with other parts such as a cylinder and a mounting disposed on the cylinder pressing surface side. That is, the abrasion detector is limited in shape and size. As a result, the size and tone of the warning sound may be limited or fluctuate. Therefore, one of the problems of the present invention is, for example, to obtain a brake pad abrasion detector capable of generating a stable warning sound without interference with other parts.

Solutions to Problems

A brake pad abrasion detector according to an embodiment includes, for example, an attachment portion attached to a back plate having a first surface to which a lining being in contact with a sliding surface of a disc rotor is fixed and a second surface opposite to the first surface, an arm portion projecting from the attachment portion to a side opposite to the second surface of the first surface and being bent on the opposite side, and a contact portion disposed on the arm portion at a position being contact with the disc rotor when the lining is abraded. According to this configuration, since no constituent member projects to the second surface side, interference with other parts disposed on the second surface side need not be considered, and the degree of freedom of design of the shapes and sizes of the attachment portion, the arm portion, and the contact portion is improved to make it possible to easily generate a stable warning sound. Further, by bending the arm portion, the rigidity of the arm portion can be improved and the length of the arm portion can be increased, so that the volume and tone of the warning sound to be generated can be easily adjusted.

Further, the arm portion of the brake pad abrasion detector according to the embodiment may be located outside the outer shape of the disc rotor, for example. According to this configuration, for example, even though the brake pad abrasion detector is disposed on the disc rotor side which is the first surface side of the back plate, interference with the disc rotor need not be considered, and the degree of freedom of design of the shape and size of the arm portion is improved, so that a stable warning sound can be more easily generated.

Further, the arm portion of the brake pad abrasion detector according to the embodiment may have, for example, a first extending portion extending in a direction opposite to the contact portion along the first surface. According to this configuration, for example, the length of the arm portion extending from the attachment portion to the contact portion can be increased. In other words, the length of the vibrating portion can be increased when the contact portion contacts the disc rotor. As a result, the frequency of the warning sound can be lowered. That is, warning sound which is easy to recognize can be generated by inhibiting the warning sound from becoming treble.

Further, the arm portion of the brake pad abrasion detector according to the embodiment may have, for example, a second extending portion provided on the end portion of the first extending portion and extending to the opposite side of the second surface. According to this configuration, for example, the length of the arm portion extending from the attachment portion to the contact portion can be increased. More specifically, the length of the vibrating portion when the contact portion contacts the disc rotor can be further increased. As a result, the frequency of the warning sound can be lowered. That is, warning sound which is easy to recognize can be generated by inhibiting the warning sound from becoming treble.

Further, the arm portion of the brake pad abrasion detector according to the embodiment may have, for example, a third extending portion disposed at an end portion of the second extending portion and extending so as to be folded back in a direction in which the contact portion is disposed. According to this configuration, for example, the length of the arm portion extending from the attachment portion to the contact portion can be increased. As a result, the length of the vibrating portion (arm portion) when the contact portion contacts the disc rotor can be further increased. As a result, the frequency of the warning sound can be lowered. That is, warning sound which is easy to recognize can be generated by inhibiting the warning sound from becoming treble.

Further, the attachment portion of the brake pad abrasion detector according to the embodiment is, for example, a plate-shaped portion having a third surface in contact with the first surface and a fourth surface on the opposite side of the third surface, the arm portion is disposed at the end portion of the third extending portion, extends on the side surface of the plate-shaped portion from the fourth surface side to the third surface side, and extends so as to be folded back to the fourth surface side. According to this configuration, for example, the length of the arm portion extending from the attachment portion to the contact portion can be increased. As a result, the length of the vibrating portion when the contact portion contacts the disc rotor can be further increased, and the frequency of the warning sound can be lowered. That is, warning sound which is easy to recognize can be generated by inhibiting the warning sound from becoming treble. Further, by bending the fourth extending portion a plurality of times, the rigidity further improves to make it possible to contribute to an increase in volume of the warning sound.

Further, the contact portion of the brake pad abrasion detector of this embodiment may extend, for example, toward the inner radial direction of the disc rotor. According to this configuration, for example, the contact portion easily receives the rotational force of the disc rotor and can contribute to an increase in warning sound.

Further, on the back plate of the brake pad abrasion detector according to the embodiment, for example, when an electric abrasion detection sensor is attached, an opening portion in which a part of the electric abrasion detection sensor is housed is provided, and the attachment portion may be fixed to the back plate to cause the arm portion to cover the opening portion. According to this configuration, for example, without changing the shape of the back plate, a specification for mounting the electric abrasion detection sensor and a specification for mounting the brake pad abrasion detector according to the embodiment can be selected.

Further, the brake pad abrasion detector according to the embodiment, for example, includes a nipping body which supports the attachment portion and nips the back plate across the first surface and the second surface, the nipping body has a first nipping portion in contact with the first surface and a second nipping portion in contact with the second surface, and at least one of the first nipping portion and the second nipping portion may have an elastic engagement portion engaged with an engaged portion of the back plate. According to this configuration, for example, when the brake pad abrasion detector is attached to or detached from the back plate, the elastic engagement portion is elastically deformed to change to an attitude in engagement or an attitude in non-engagement to make it possible to be attached to or detached from the engaged portion of the back plate. For this reason, an attaching/detaching operation for the brake pad abrasion detector can be easily performed. Also, since the brake pad abrasion detector is elastically engaged with the back plate by the elastic engagement portion, a backlash to the engaged portion is reduced and the attachment state is stabilized. As a result, the brake pad abrasion detector can contribute to stability of warning sound.

DESCRIPTION OF EMBODIMENT

An exemplary embodiment of the present invention will be disclosed below. The configuration according to the embodiment described below and the operation and result (effect) brought about by the configuration are examples. The present invention can be achieved by a configuration other than that disclosed in the following embodiment. Further, according to the present invention, it is possible to obtain at least one of various effects (including derivative effects) obtained by the configuration.

A brake pad abrasion detector described in this embodiment can be attached to a disc brake device mounted on a vehicle as an example.

The disc brake device includes a floating caliper or a stationary caliper. For example, a disc brake device employing the stationary caliper includes a disc rotor assembled to an axle hub and rotating integrally with a wheel and a caliper (stationary caliper) disposed to straddle a part of the outer peripheral portion of the disc rotor. The caliper includes an inner brake pad, an outer brake pad, and for example, four pistons which generate pressing force for pressing these brake pads against the disc rotors. The disc rotor has a disc-shaped sliding surface (braked surface) which can be nipped by the lining of the brake pad on the inner side and the lining of the brake pad on the outer side. In the disc rotor, the rotation is braked by nipping the sliding surface by the lining of the brake pad on the inner side and the lining of the brake pad on the outer side during braking.

The lining of the disc brake device configured as described above is abraded and becomes thin by the repetition of braking operations, and the lining eventually reaches the application limit and is desired to be replaced. Therefore, a user needs to be warned when the lining reaches the application limit. The brake pad abrasion detector according to the embodiment is an audible mechanical sensor which is attached to a brake pad and generates warning sound (vibration sound) by coming into contact with the disc rotor when, for example, the lining reaches the application limit.

Figure 1:
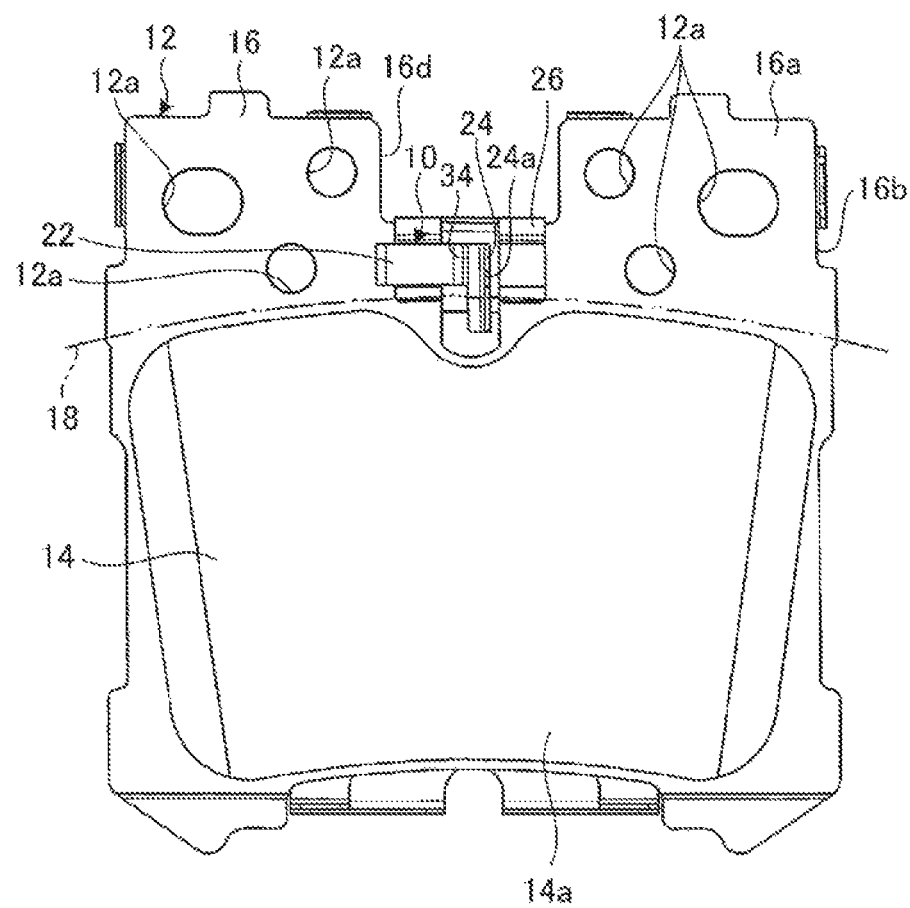
FIG. 1 is a front view of a brake pad to which a brake pad abrasion detector according to an embodiment is attached.

FIG. 1 is a front view of a brake pad 12 to which a brake pad abrasion detector 10 (to be referred to as an abrasion detector hereinafter) according to an embodiment is attached. The brake pad 12 has a plurality of guide holes 12a, and is supported by the caliper through the guide hole 12a. The brake pad 12 has a lining 14 and a back plate 16, and the abrasion detector 10 is fixed to the back plate 16. When the lining 14 is pressed against a disc rotor 18 rotating with the wheel, is abraded, and becomes thin, in braking, the back plate 16 approaches the disc rotor 18 by a length corresponding to a reduction in thickness of the lining 14. Therefore, in a state before the lining 14 reaches the application limit, the abrasion detector 10 is separated from the disc rotor 18. When the lining 14 reaches the application limit, the abrasion detector 10 and the rotating disc rotor 18 come into contact with each other to generate warning sound (sliding sound, contact sound, vibration sound) for causing the user to recognize the abrasion of the lining 14.

The lining 14 is a fan-shaped plate-like member which has a braking surface 14a which is in direct contact with the sliding surface (side surface) of the disc rotor 18 rotating with the wheel and an adhering surface, for example, bonded to the back plate 16 on the opposite side of the braking surface 14a. The lining 14 is made of, for example, an organic friction material using aramid fibers, inorganic fibers, steel fibers or the like. This organic friction material can be made into a composite material obtained by adding various additive materials to a fiber base material and bonding them with a thermosetting resin. In addition, some of the lining 14 is made of an inorganic friction material.

The back plate 16 has, for example, a substantially rectangular plate-like part having a first surface 16a to which the lining 14 in contact with the sliding surface of the disc rotor 18 is fixed and a second surface 16b opposite to the first surface 16a. In order to support the lining 14, the back plate 16 is required to have heat resistance and high mechanical strength in a high temperature atmosphere. As the back plate 16, for example, a ceramic plate or a metal plate can be used. A piston of the caliper is disposed on the back portion (the second surface 16b side) of the back plate 16. When the brake pedal is stepped on by a user (driver) or when automatic braking is performed by a command from the control unit of the vehicle, the piston is actuated to push the back plate 16 to push the brake pad 12 against the disc rotor 18 to generate braking force.

Figure 2:
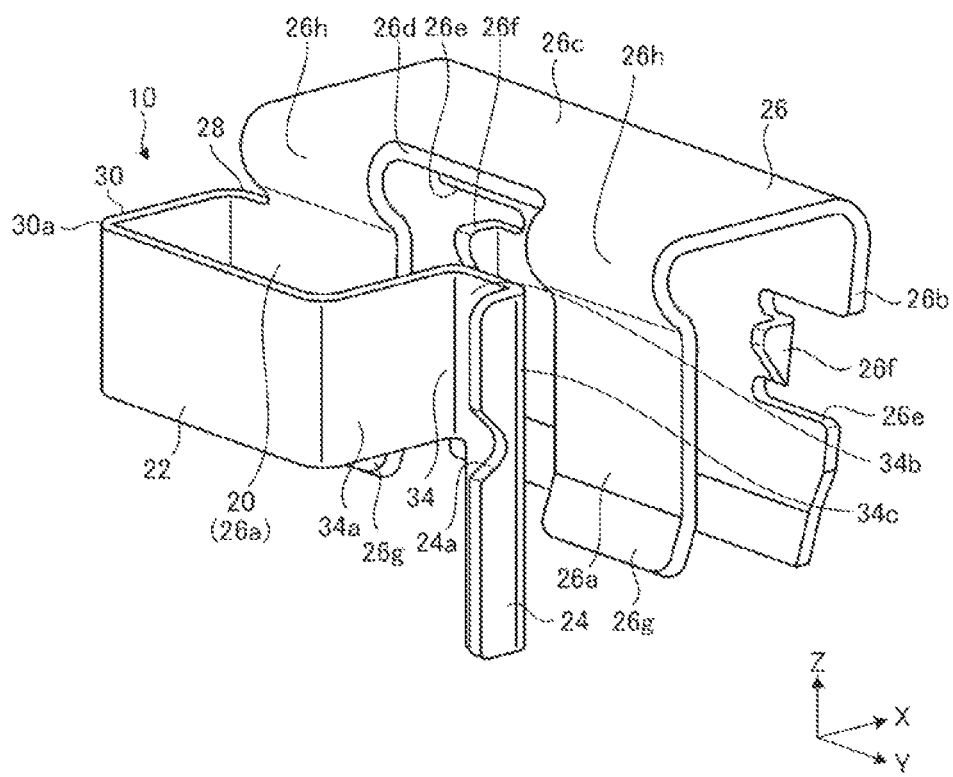
FIG. 2 is a perspective view of the brake pad abrasion detector according to the embodiment.
Figure 3:
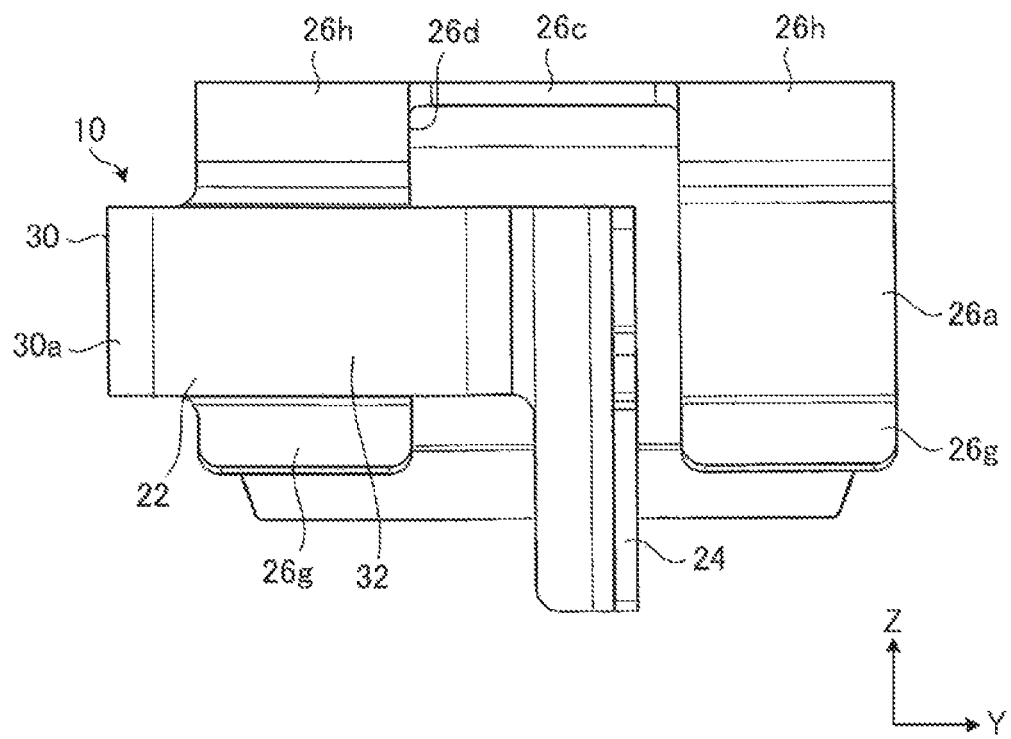
FIG. 3 is a front view of the brake pad abrasion detector according to the embodiment.
Figure 4:
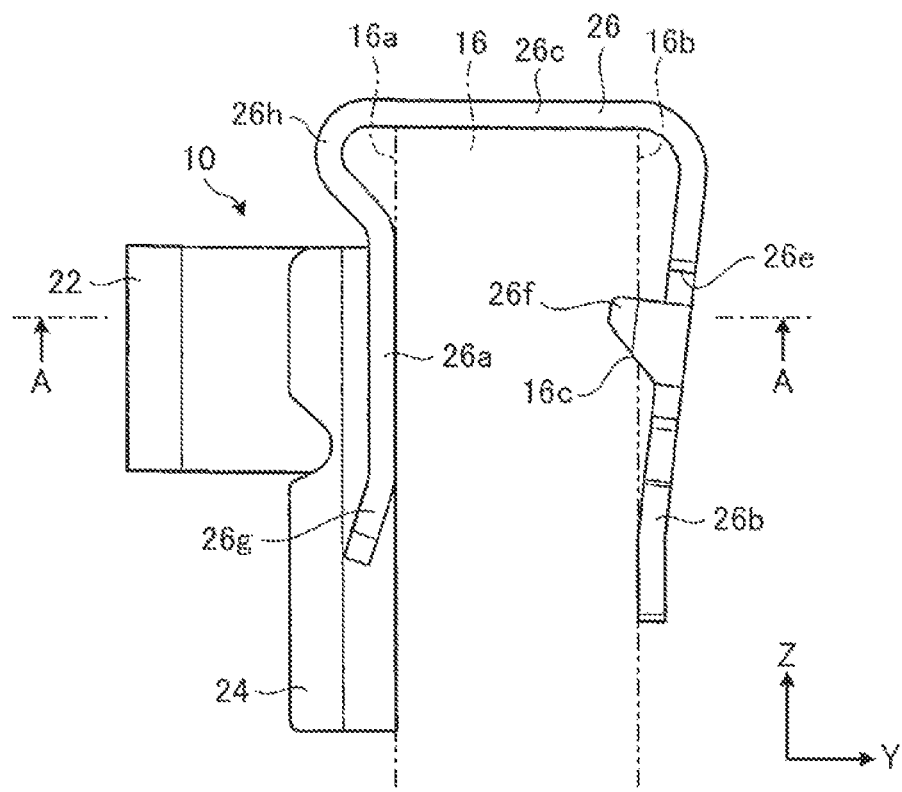
FIG. 4 is a side view of the brake pad abrasion detector according to the embodiment.
Figure 5:
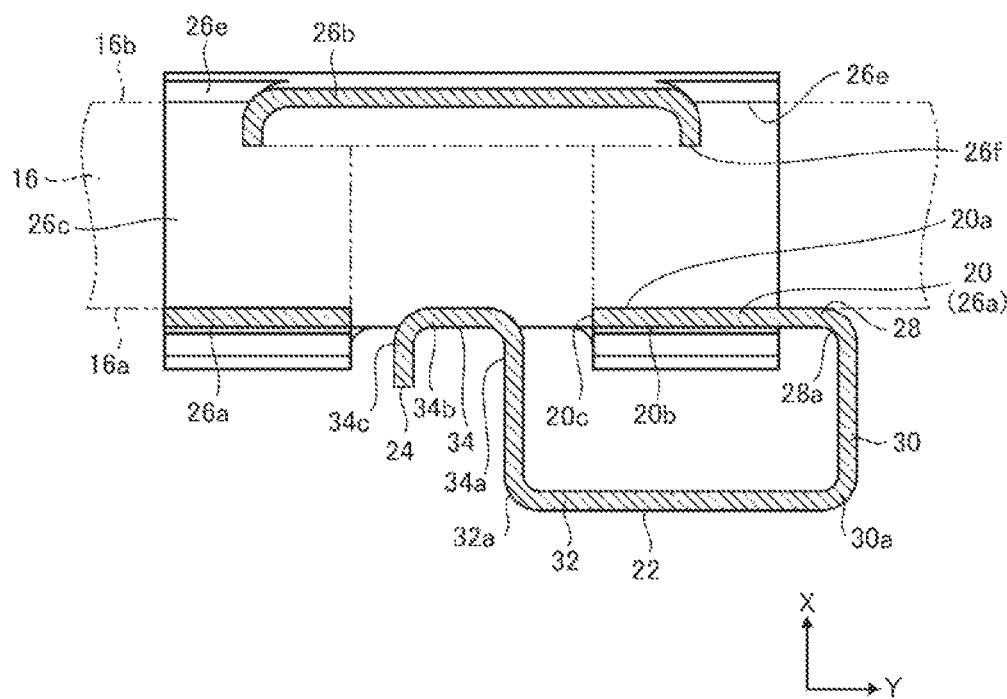
FIG. 5 is a cross-sectional view of the brake pad abrasion detector according to the embodiment taken along a line A-A in FIG. 4.

Details of the shape of the abrasion detector 10 fixed to the back plate 16 will be described with reference to FIGS. 2 to 5. FIG. 2 is a perspective view of the abrasion detector 10. FIG. 3 is a front view of the abrasion detector 10. FIG. 4 is a side view of the abrasion detector 10. FIG. 5 is a sectional view taken along a line A-A in the abrasion detector 10 shown in FIG. 4. In this embodiment, an X axis, a Y axis and a Z axis are defined for explanation as shown in FIGS. 2 to 5. The X axis, the Y axis, and the Z axis are orthogonal to each other. The X axis is along a direction of width of the abrasion detector 10 (direction of thickness of the disc rotor 18). The Y axis is along a longitudinal direction of the abrasion detector 10. The Z axis is along a direction of height of the abrasion detector 10.

The abrasion detector 10 includes an attachment portion 20, an arm portion 22, and a contact portion 24. The abrasion detector 10 can be formed, for example, by bending a metal material having spring property, for example, a metal plate such as a stainless-steel plate. The attachment portion 20 is a plate-like portion having a third surface 20a in contact with the first surface 16a and a fourth surface 20b on the opposite side of the third surface 20a. The attachment portion 20 is attached to the back plate 16. The first surface 16a partially has a flat surface and serves as a reference surface for fixing the abrasion detector 10. The lining 14 is also fixed to the reference surface of the first surface 16a. That is, by fixing the attachment portion 20 and the lining 14 to a surface having the same level, the installation height (height in the X-axis direction) of the abrasion detector 10 for detecting the thickness (remaining thickness obtained after the abrasion) of the lining 14 can be determined. In this case, the attachment portion 20 is desired to be closely fixed to the first surface 16a.

In the embodiment, the attachment portion 20 is fixed to be biased against the first surface 16a by an elastic clip 26 (nipping body) which nips the first surface 16a and the second surface 16b of the back plate 16 to straddle the first surface 16a and the second surface 16b. The elastic clip 26 has a first biasing portion 26a (first nipping portion) which is in contact with the first surface 16a, a second biasing portion 26b (second nipping portion) which is in contact with the second surface 16b, and a connecting portion 26c connecting the first biasing portion 26a and the second biasing portion 26b and formed to so as to straddle the first surface 16a and the second surface 16b. Note that the first biasing portion 26a is divided by two by forming a first cutout portion 26d substantially at the center thereof. One of the first biasing portions 26a also serves as the attachment portion 20. That is, a part of the first biasing portion 26a forms the attachment portion 20. In addition, in the second biasing portion 26b, second cutout portions 26e are formed at both ends in the width direction (the Y-axis direction in the drawing), and a folding claw 26f is formed inside each of the second cutout portions 26e. The folding claw 26f is folded back in the direction from the second surface 16b side to the first surface 16a and is engaged with a groove portion 16c (engaged portion) formed in the back plate 16 to position the elastic clip 26 (see FIG. 4). That is, the folding claw 26f positions the abrasion detector 10 with respect to the back plate 16.

As shown in FIG. 4, the first biasing portion 26a is bent such that a first end portion 26g (in the Z-axis direction in the drawing) on the far side from the connecting portion 26c comes away from the first surface 16a to the opposite side of the second surface 16b. When the first end portion 26g is bent to attach the elastic clip 26 to the back plate 16, the back plate 16 is designed to be easily inserted between the first biasing portion 26a and the second biasing portion 26b to facilitate a mounting operation. Further, the second biasing portion 26b is obliquely inclined in a direction approaching the first biasing portion 26a in a free attitude state in which the second biasing portion 26b is not attached to the back plate 16. That is, when the second biasing portion 26b is mounted on the back plate 16, the second biasing portion 26b is pushed and spread in a direction opposite to the first surface 16a from the second surface 16b to generate spring force so as to bias the second surface 16b. As a result, the back plate 16 is nipped by the first biasing portion 26a and the second biasing portion 26b in a biased state, and the elastic clip 26, i.e., the abrasion detector 10 is fixed to the back plate 16.

The first biasing portion 26a is bent such that a second end portion 26h on a side close to the connecting portion 26c comes away from the first surface 16a in the direction opposite to the second surface 16b. By forming the second end portion 26h in this way, when the connecting portion between the first biasing portion 26a and the connecting portion 26c is bent, the bending can be performed such that the surface of the first biasing portion 26a is parallel to the first surface 16a. In other words, the processing can be performed such that the third surface 20a (see FIG. 5) in contact with the first surface 16a in the attachment portion 20 is parallel to the first surface 16a. As a result, the attachment portion 20 can be tightly fixed to the first surface 16a by the elastic clip 26.

Next, the details of the arm portion 22 will be described. The arm portion 22 has a shape protruding on a side opposite to the second surface 16b of the first surface 16a and being bent on the opposite side. That is, the portion which generates warning sound in the abrasion detector 10 is present only on the first surface 16a side of the back plate 16. Further, the arm portion 22 is bent on the first surface 16a side to improve the rigidity of the arm portion 22. The rigidity of the arm portion 22 is improved to make it possible to increase the warning sound generated by the contact portion 24 contacting the rotating disc rotor 18. When the frequency of the generated contact sound (warning sound) is too high (too high pitch), the sound becomes hard to hear. Therefore, the arm portion 22 has a configuration which lowers the frequency of the contact sound. Specifically, the length of the arm portion 22 is increased to lower the frequency so as to lower the sound to be generated.

Therefore, as shown in FIG. 5, the arm portion 22 first has a first extending portion 28 extending along the first surface 16a in a direction opposite to the contact portion 24. In the embodiment, the first extending portion 28 linearly extends from the attachment portion 20 along the first surface 16a in the Y-axis direction. % Subsequently, the arm portion 22 has a second extending portion 30 which is disposed at an end portion 28a of the first extending portion 28 and extends to a side opposite to the second surface 16b. In the embodiment, the second extending portion 30 is bent at a substantially right angle at the end portion 28a of the first extending portion 28 and linearly extends in the X-axis direction. Further, the arm portion 22 has a third extending portion 32 which is disposed at an end portion 30a of the second extending portion 30 and extends to be folded back in a direction in which the contact portion 24 is disposed. In the embodiment, the third extending portion 32 is bent at a substantially right angle in the Y-axis direction from the end portion 30a of the second extending portion 30 and linearly extends in the Y-axis direction. The arm portion 22 has a fourth extending portion 34 which is disposed at an end portion 32a of the third extending portion 32, extends from the fourth surface 20b side to the third surface 20a side on a side surface 20c of a plate-like portion of the attachment portion 20, and extends to be folded back to the fourth surface 20b side. In the embodiment, the fourth extending portion 34 has a first folded portion 34a which is bent at a substantially right angle at the end portion 32a of the third extending portion 32 and linearly extends in the X-axis direction toward the third surface 20a. Further, the fourth extending portion 34 (the first folded portion 34a) further has a second folded portion 34b which bends at a substantially right angle at a position over the fourth surface 20b toward the third surface 20a and linearly extends toward the contact portion 24 in the Y direction, and has a third folded portion 34c which is folded at a substantially right angle in the X-axis direction. In this way, the arm portion 22 and the fourth extending portion 34a are bent two or more times to increase the length of a part freely oscillated about the attachment portion 20 serving as a base portion without increasing the abrasion detector 10 in width in the Y-axis direction. In addition, the arm portion 22 is bent at a plurality of positions to improve the rigidity of the arm portion 22 as a whole.

As shown in FIG. 1, in the arm portion 22, an elastic clip 26 is attached to an opening portion 16d (concave portion or recessed portion) of the back plate 16 so as to be located outside the outer shape of the disc rotor 18. Further, as shown in FIGS. 1 and 2, in the arm portion 22 (the fourth extending portion 34), the contact portion 24 extending in the inner radial direction of the disc rotor 18 is disposed. That is, while the arm portion 22 is prevented from contacting the disc rotor 18, only the contact portion 24 is designed to be able to be in contact with the sliding surface of the disc rotor 18 coming close to the contact portion 24 due to abrasion of the lining 14. Further, when the contact portion 24 is extended in the radial direction of the disc rotor 18, the rotational direction of the disc rotor 18 is substantially orthogonal to the extending direction of the contact portion 24. For this reason, the rotational force of the disc rotor 18 can be easily transmitted to the contact portion 24, and a deflection amount (vibration amount) of the contact portion 24 increases to make it possible to contribute to an increase in warning sound (volume).

As shown in FIG. 1 and FIG. 2, a constricted portion 24a is formed in the contact portion 24 and a forward portion extended from the constricted portion 24a is in contact with the disc rotor 18. The constricted portion 24a is formed in this manner to make it easy to bend the contact portion 24 when the contact portion 24 comes into contact with the disc rotor 18, the warning sound is easily generated, and the tone of the warning sound is easily stabilized. That is, comfortable sound can be easily generated.

Figure 6:
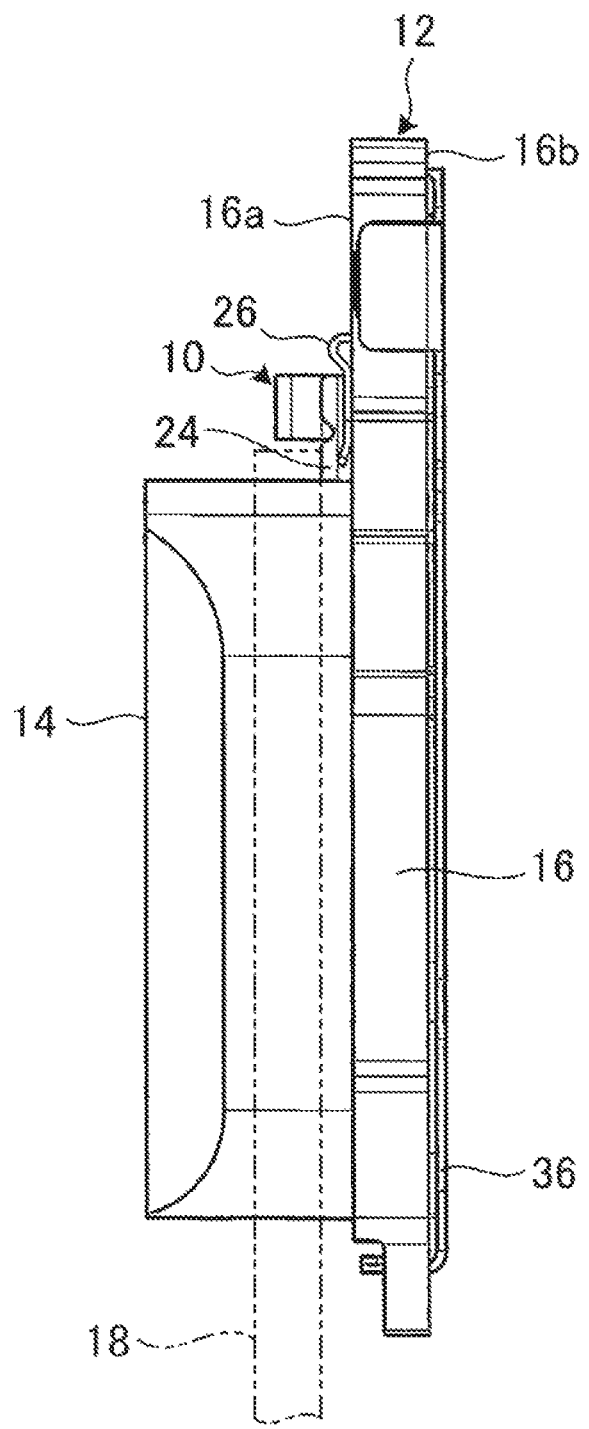
FIG. 6 is a side view of the brake pad to which the brake pad abrasion detector according to the embodiment is attached.

FIG. 6 is a side view showing a state in which the abrasion detector 10 configured as described above is attached to the brake pad 12 (back plate 16). As shown in FIG. 6, the abrasion detector 10 according to the embodiment protrudes toward the first surface 16a side of the back plate 16 on which the lining 14 is supported. Therefore, the abrasion detector 10 does not interfere with cylinders, mountings, and the like which are present on the second surface 16b side of the back plate 16. Further, the arm portion 22a is bent two more times on the first surface 16a side to make it possible to secure rigidity (strength) required when the contact portion 24 comes into contact with the disc rotor 18 and to secure the length of the arm portion 22 required to generate necessary tone or a necessary volume. A shim 36 to prevent noise (squeal) of the brake pad 12 is disposed on the second surface 16b of the back plate 16. As shown in FIG. 4, the second biasing portion 26b of the elastic clip 26 of the abrasion detector 10 protrudes to the second surface 16b side. Therefore, the shim 36 is partially cut out to expose second biasing portion 26b, and either one of a protrusion length of the second biasing portion 26b and the thickness of the shim 36 is adjusted to make the protrusion length smaller than the thickness of the shim 36. As a result, the second biasing portion 26b can be prevented from protruding from the second surface 16b to prevent the abrasion detector 10 from interfering when the brake pad 12 is fixed to the caliper.

In FIG. 6, when the lining 14 is biased against the rotating disc rotor 18 to progress the abrasion of the lining 14, the disc rotor 18 gradually comes close to the back plate 16 in a braking operation. When the lining 14 reaches the application limit (the position of the disc rotor 18 indicated by the two-dot chain line in FIG. 6), the disc rotor 18 and the contact portion 24 come into contact with each other to generate warning sound (sliding sound or contact sound). That is, the user is notified that the lining 14 has reached the application limit. Note that the application limit of the lining 14 does not mean a situation in which braking force cannot be immediately generated but means that the replacement of the linings 14 is recommended.

Figure 7:
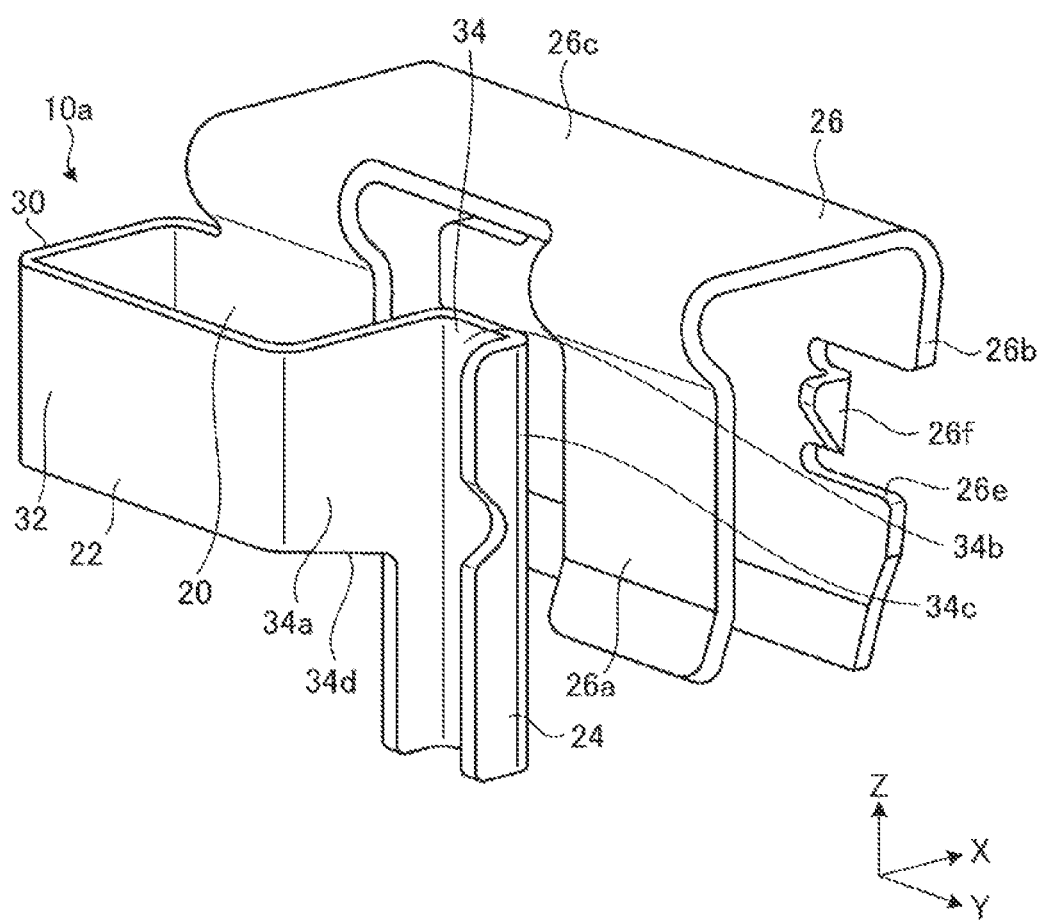
FIG. 7 is a perspective view showing a modified example of the brake pad abrasion detector according to the embodiment.

An abrasion detector 10a shown in FIG. 7 is a perspective view showing a modified example of the abrasion detector 10 shown in FIG. 2. The basic structure of the abrasion detector 10a is the same as that of the abrasion detector 10, and the same reference numerals are given to parts having the same configuration and functions as those of the abrasion detector 10, and a description thereof will be omitted. In the abrasion detector 10a, an end portion 34d of the first folded portion 34a of the fourth extending portion 34 included in the arm portion 22 is formed to be wide. In the abrasion detector 10a, the rigidity of the fourth extending portion 34 (the arm portion 22) is improved by inclining the end portion 34d of the first folded portion 34a. As a result, this modification can contribute to a further increase in warning sound to be generated and further stabilization of tone.

Figure 8:
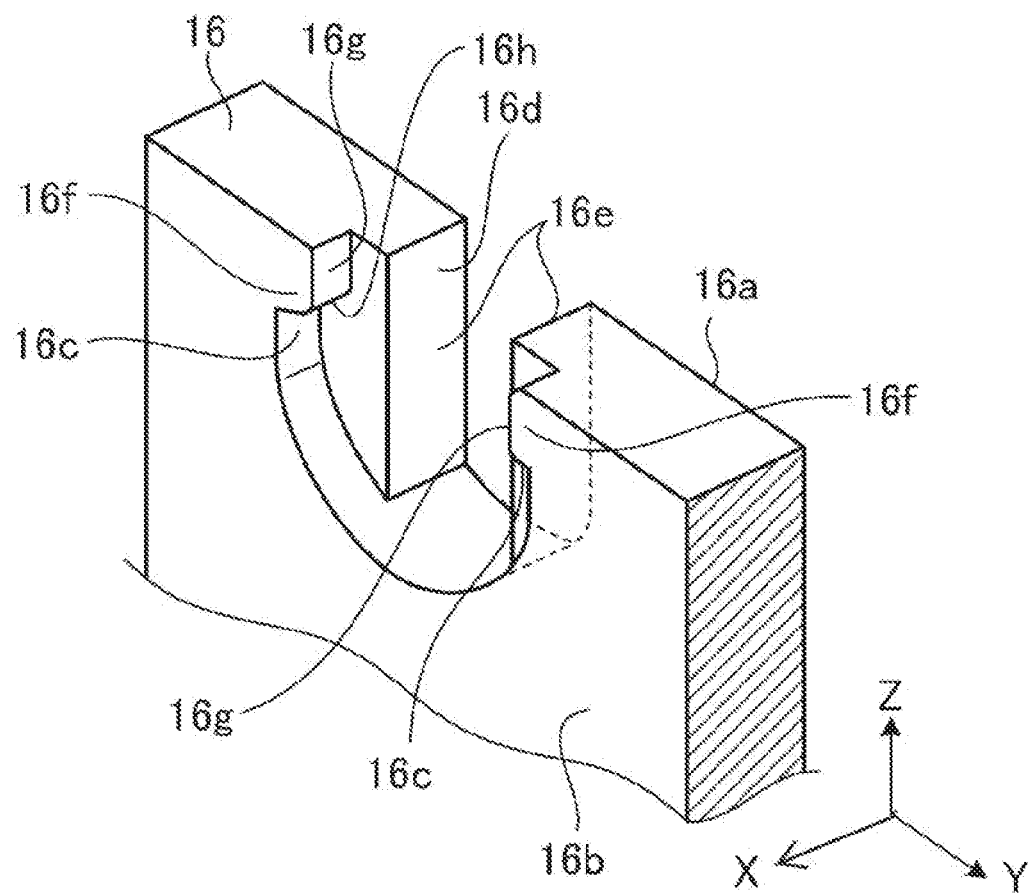
FIG. 8 is a perspective view of a back plate to which the brake pad abrasion detector and the electric abrasion detection sensor according to the embodiment can be attached.
Figure 9:
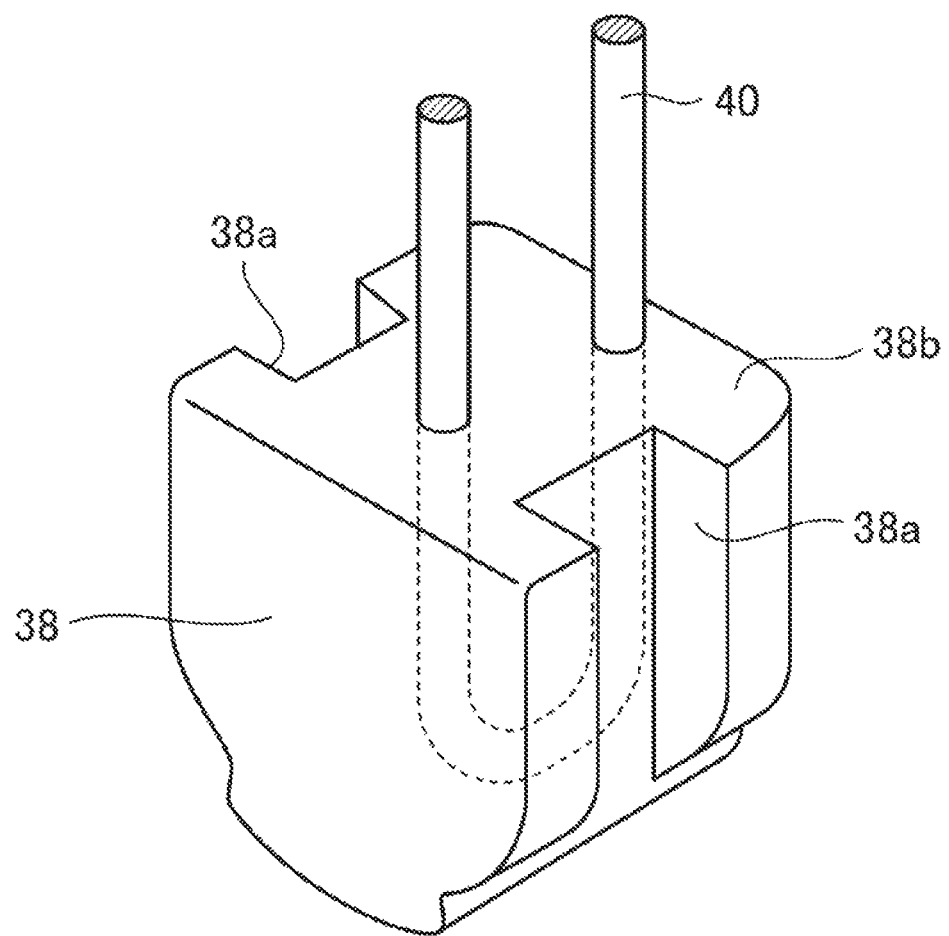
FIG. 9 is a perspective view showing an example of a sensor portion of an electric abrasion detection sensor which can be attached to the back plate shown in FIG. 8.

Meanwhile, as methods of detecting that the abrasion of the lining 14 has reached the application limit, a mechanical type (audible type) in which contact sound is generated when the contact portion 24 is brought into contact with the rotating disc rotor 18 as described above and an electric type for outputting a detection signal are given. FIG. 8 is an enlarged perspective view of the back plate 16 to which the abrasion detector 10 (10a) according to the embodiment can be attached and an electric abrasion detection sensor 38 shown in FIG. 9 can be attached. FIG. 9 is a schematic perspective view of a sensor portion of the electric abrasion detection sensor 38. In the electric abrasion detection sensor 38, a lead wire 40 is buried in a housing 38b in which a guide groove 38a to fix the electric abrasion detection sensor 38 to the back plate 16 is formed. The housing 38b is made of, for example, a resin material. As a result of the abrasion and thinning of the lining 14, the housing 38b is gradually ground by the contact with the rotating disc rotor 18. When the lining 14 is further abraded to reach the application limit, the lead wire 40 is also ground to lead to disconnection. A sensor main body (control unit) (not shown) electrically detects the disconnection, for example, to turn on a warning lamp disposed on a console panel or the like at a driver's seat or output warning sound or a message so as to notify a user that the lining 14 has reached the application limit. The back plate 16 has the opening portion 16d in which a part of the electric abrasion detection sensor 38 is housed when the electric abrasion detection sensor 38 is attached, and a guide portion 16e engaged with the guide groove 38a of the electric abrasion detection sensor 38. The electric abrasion detection sensor 38 is positioned by fitting the electric abrasion detection sensor 38 in the opening portion 16d while the guide portion 16e is inserted into the guide groove 38a. The electric abrasion detection sensor 38 can be fixed to the back plate 16 by engaging a claw portion of an elastic clip (not shown) with the groove portion 16c (engaged portion).

As described above, the electric abrasion detection sensor 38 may be employed in an upper-class vehicle or as optional equipment. Meanwhile, the mechanical abrasion detector 10 as shown in FIG. 2 may be employed in vehicles the costs of which are desired to be reduced. Use of the same back plates 16 in both the case where the abrasion detector 10 is employed and the case where the abrasion detector 10a is employed contributes to common use of components, standardization of design, cost reduction, and the like. Therefore, the abrasion detector 10 (10a) according to the embodiment is configured such that the attachment portion 20 can be fixed to the back plate 16 to cover the opening portion 16d with the arm portion 22. For example, when the position of the groove portion 16c of the back plate 16 shown in FIG. 8 is made to coincide with the position of the folding claw 26f shown in FIG. 2, the elastic clip 26 can be directly attached to the back plate 16 to which the electric abrasion detection sensor 38 shown in FIG. 8 can be attached. That is, the abrasion detector 10a and the abrasion detector 10 are selectively attached to the same back plate 16 to make it possible to perform abrasion detection for the lining 14 in the same manner as described above.

Figure 10:
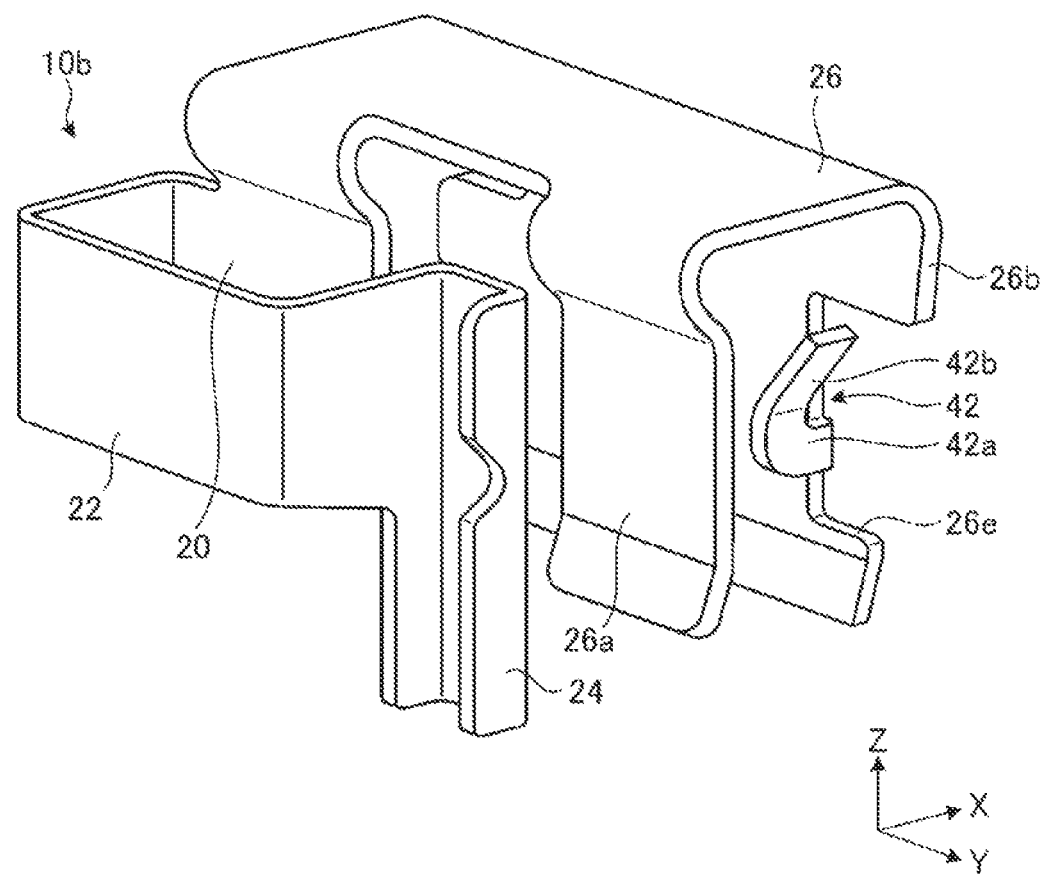
FIG. 10 is a perspective view showing another modified example of the brake pad abrasion detector according to the embodiment.
Figure 11:
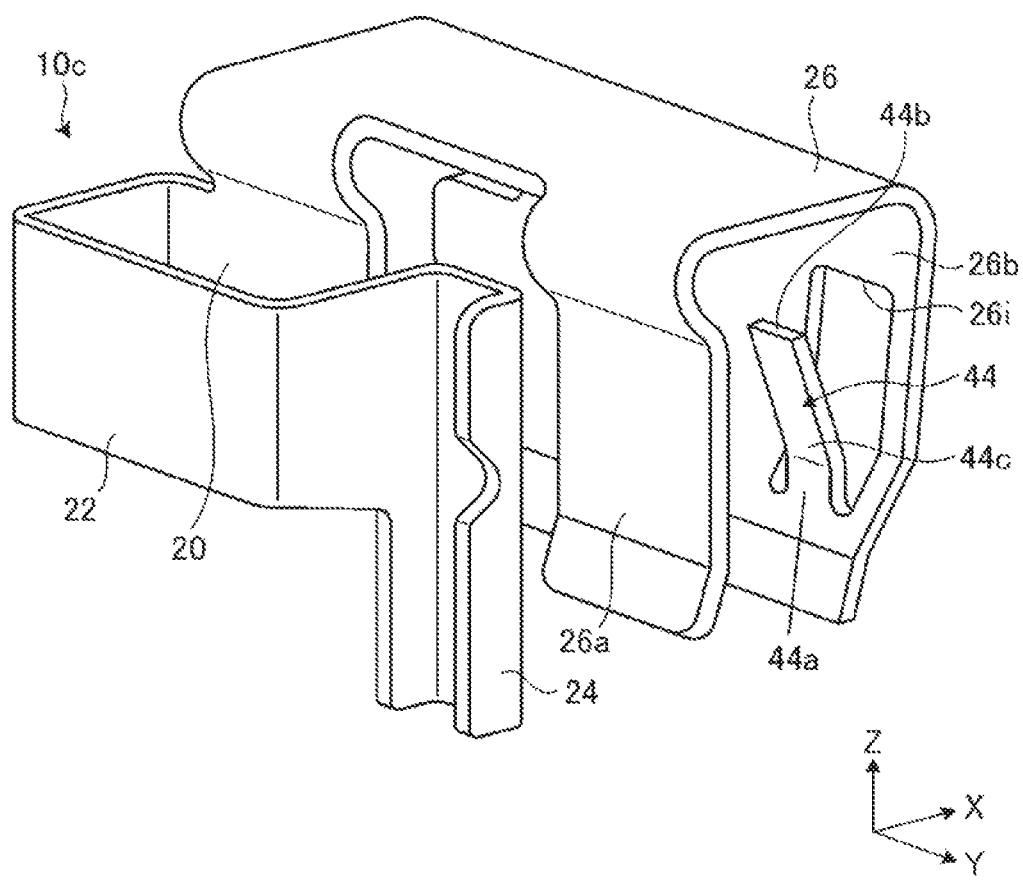
FIG. 11 is a perspective view showing still another modified example of the brake pad abrasion detector according to the embodiment.

In FIG. 10, an abrasion detector 10b is shown as a modified example of the abrasion detector 10a, and an abrasion detector 10c is shown in FIG. 11 as another modified example thereof. Each of the abrasion detector 10b and the abrasion detector 10c has a structure capable of improving the attaching/detaching workability when the abrasion detector 10b or 10c is attached to/detached from the opening portion 16d of the back plate 16 shown in FIG. 8. The basic structures of the abrasion detector 10b and the abrasion detector 10c are the same as the structure of the abrasion detector 10a shown in FIG. 7, and the same reference numerals are given to parts having the same configuration and functions similar to those of the abrasion detector 10a, and a description thereof will be omitted.

In the abrasion detector 10b shown in FIG. 10, an elastic engagement portion 42 is formed as an engagement portion folded back in a direction from the second surface 16b side toward the first surface 16a of the back plate 16 in the second cutout portion 26e formed in the second biasing portion 26b (second nipping portion) being in contact with the second surface 16b of the back plate 16. The elastic engagement portion 42 includes a base portion 42a extending in the direction from the edge portion of the second cutout portion 26e in the width direction (Y-axis direction in the drawing) toward the first surface 16a, and an elastic portion 42b having one end connected to the base portion 42a and the other end inclined toward the outside of the second biasing portion 26b in the width direction (Y-axis direction in the drawing). Although being hidden by the attachment portion 20, also in the second cutout portion 26e on the other side of the second biasing portion 26b, the elastic engagement portion 42 having the elastic portion 42b inclined toward the outside of the second biasing portion 26b in the width direction is disposed. The elastic engagement portion 42 secures elastic force by utilizing the spring property of the plate member forming the second biasing portion 26b.

The elastic engagement portion 42 is formed on the second biasing portion 26b at an interval such that the elastic engagement portion 42 passes between one pair of facing guide surfaces 16g (facing surfaces of the back plate 16 in the width direction (the Y-axis direction in the drawing)) of one pair of convex portions 16f formed above the groove portion 16c of the back plate 16 shown in FIG. 8. In this case, the outside surface of the base portion 42a, i.e., the outside of the second biasing portion 26b in the width direction (the Y-axis direction in the drawing) may be configured to contact the guide surface 16g. Further, the elastic portion 42b of the elastic engagement portion 42 is formed to be larger than a distance between the pair of guide surfaces 16g in the width direction (the width direction of the back plate 16 (Y-axis direction in the drawing)).

When the abrasion detector 10b in which the elastic engagement portion 42 configured as described above is disposed is attached to the back plate 16 shown in FIG. 8, as in the case in which the abrasion detector 10 is attached, the abrasion detector 10b is attached to cover the opening portion 16d with the arm portion 22. That is, the abrasion detector 10b is inserted into the opening portion 16d from the above (Z-axis direction in the drawing) such that the base portion 42a of the elastic engagement portion 42 is along the guide surface 16g of the back plate 16. At this time, the elastic portion 42b is inserted with an attitude (compression attitude) in a disengaged state in which the elastic portion 42b is elastically deformed inward in the width direction (Y-axis direction in the drawing) of the second biasing portion 26b by the pair of guide surfaces 16g. Since the groove portion 16c under the convex portion 16f is wider than the guide surface 16g, when the elastically deformed elastic portion 42b passes through the lower end portion of the guide surface 16g, the shape of the elastic portion 42b is restored outward, so that the elastic portion 42b has an attitude (release attitude) in an engagement state, spreads in the groove portion 16c, and is engaged. When a facing width of the groove portion 16c is set to be smaller than the facing width of the elastic portion 42b of the elastic engagement portion 42 in a non-deformation state, the elastic portion 42b is engaged with the lower surface 16h of the convex portion 16f with elastic force. As a result, the abrasion detector 10b is fixed to the back plate 16. When the abrasion detector 10b is removed from the back plate 16, the abrasion detector 10b need only be removed from the opening portion 16d while the elastic portion 42b is deformed inward in the width direction (Y-axis direction in the drawing) of the second biasing portion 26b.

As described above, since the abrasion detector 10b can be engaged with the groove portion 16c of the opening portion 16d while the elastic portion 42b of the elastic engagement portion 42 is elastically deformed, an attachment operation for the back plate 16 becomes easier than that of the abrasion detector 10 and 10a. A removing operation for the abrasion detector 10b in which the elastic engagement portion 42 is disposed can be more easily performed for replacement and maintenance. Further, since the abrasion detector 10b is elastically engaged with the back plate 16 by the elastic engagement portion 42, backlash of the abrasion detector 10b (elastic clip 26) with respect to the groove portion 16c (engaged portion) is reduced to stabilize the attachment state of the abrasion detector 10b. As a result, the brake pad abrasion detector can contribute to stability of warning sound.

In an abrasion detector 10c according to another modified example shown in FIG. 11, an inverted U-shaped cutout portion 26i is formed at the second biasing portion 26b (second nipping portion) contacting the second surface 16b of the back plate 16 and a remaining part inside the cutout portion 26i is used as an elastic engagement portion 44. The elastic engagement portion 44 has an elastic portion 44c such that an upper end portion 44b on the opposite side is inclined in a direction from the second biasing portion 26b toward the first biasing portion 26a (direction from the second surface 16b of the back plate 16 toward the first surface 16a) by using a lower end portion 44a connected to the second biasing portion 26b as a base portion. Although being hidden by the attachment portion 20, the cutout portion 26i is similarly formed on the other side of the second biasing portion 26b, and the elastic engagement portion 44 having the elastic portion 44c of which upper end portion 44b is inclined from the second biasing portion 26b toward the first biasing portion 26a is disposed. The elastic engagement portion 44 ensures elastic force by using the spring property of the plate member forming the second biasing portion 26b.

The elastic engagement portion 44 is formed in the second biasing portion 26b at an interval equal to the forming width (forming width of the back plate 16 in the width direction (Y-axis direction in the drawing)) of a pair of convex portions 16f formed above the groove portion 16c of the back plate 16 shown in FIG. 8. In this case, a distance between the outer edge portions of the pair of elastic portions 44c (the outer edge portions in the width direction of the second biasing portion 26b (Y-axis direction in the drawing)) is smaller than a distance between the pair of groove portions 16c of the back plate 16 in the width direction and larger than a distance between the pair of guide surfaces 16g of the back plate 16.

When the abrasion detector 10c in which the elastic engagement portion 44 configured as described above is disposed is attached to the back plate 16 shown in FIG. 8, as in the case where the abrasion detector 10 is attached, the abrasion detector 10c is attached to cover the opening portion 16d with the arm portion 22. That is, the abrasion detector 10c is inserted into the opening portion 16d from the above (Z-axis direction in the drawing) such that the lower end portion 44a of the elastic engagement portion 44 is along the second surface 16b of the convex portion 16f of the back plate 16. At this time, the elastic portion 44c is inserted with an attitude (compression attitude) in a disengaged state in which the elastic portion 44c is elastically deformed in a direction (X-axis direction in the drawing) in which the elastic portion 44c fits into the cutout portion 26i of the second biasing portion 26b by the second surface 16b of the back plate 16. The shape of the elastically deformed elastic portion 44c is restored to the side of the first urging portion 26a when the elastic portion 44c passes through the lower end portion of the convex portion 16f, and the elastic portion 44c has an attitude (releasing attitude) in an engaged state and is elastically engaged with the groove portion 16c, and the upper end portion 44b is engaged with the lower surface 16h of the convex portion 16f. As a result, the abrasion detector 10c is fixed to the back plate 16. When the abrasion detector 10c is removed from the back plate 16, the abrasion detector 10b need only be removed from the opening portion 16d while the elastic portion 44c is elastically deformed in a direction of the cutout portion 26i of the second biasing portion 26b (X-axis direction in the drawing).

As described above, since the abrasion detector 10c can be engaged with the groove portion 16c of the opening portion 16d while the elastic portion 44c of the elastic engagement portion 44 is elastically deformed, an attachment operation for the back plate 16 becomes easier than that of the abrasion detector 10 and 10a. Further, a removing operation of the abrasion detector 10c in which the elastic engagement portion 44 is disposed can be more easily performed for replacement and maintenance. When the depth (the depth in the X-axis direction in the drawing) of the back plate 16 of the groove portion 16c in a direction of plate thickness is set smaller than the inclination amount (projection amount) of the elastic portion 44c of the elastic engagement portion 44 in a non-deformation state, the elastic portion 44c is engaged with the groove portion 16c with elastic force. As a result, backlash of the abrasion detector 10c (elastic clip 26) with respect to the groove portion 16c (engaged portion) can be reduced, and the attachment state of the abrasion detector 10c can be stabilized to contribute to stabilization of warning sound.

Although the examples in which the elastic engagement portion 42 of the abrasion detector 10b shown in FIG. 10 and the elastic engagement portion 44 of the abrasion detector 10c shown in FIG. 11 are formed in the second biasing portion 26b have been described, for example, the elastic engagement portion 42 and the elastic engagement portion 44 may be formed on the first biasing portion 26a side. In this case, the groove portion 16c of the back plate 16 is consequently formed on the first surface 16a side. Further, the elastic engagement portion 42 (44) may be formed in each of both of the first biasing portion 26a and the second biasing portion 26b. In this case, the fixing strength can be further improved to contribute to the stabilization of warning sound.

The examples in which a pair of the elastic engagement portions 42 (44) are formed in the second biasing portion 26b in the direction of width (Y-axis direction in the drawing) have been described above. However, the present invention is not limited the examples. For example, one elastic engagement portion in the width direction may be of a fixed type like the folding claw 26f shown in FIG. 7, and the other may be of an elastic type like the elastic engagement portion 42 (44). In this case, since the elastic engagement portion on the folding claw 26f side is easily formed, this configuration can contribute to cost reduction. The number of elastic engagement portions 42 (44) to be formed can be appropriately selected, and may be determined according to, for example, the area of the first biasing portion 26a or the second biasing portion 26b and a position where the groove portion 16c (engaged portion) on the back plate 16 side can be formed. For example, three or more elastic engagement portions may be formed in either one of the first biasing portion 26a or the second biasing portion 26b, or one elastic engagement portion may be formed in each of the first biasing portion 26a and the second biasing portion 26b.

In the above embodiment, the example in which the arm portion 22 is bent at a substantially right angle at each end portion has been described, but the present invention is not limited to this example. For example, the arm portion 22 may be bent at an angle other than right angle, and as described above, the arm portion 22 can be increased in length and rigidity, and the same effect as described above can be obtained. In addition, the example in which the first extending portion 28, the second extending portion 30, the third extending portion 32, and the fourth extending portion 34 are each linearly formed has been described, but each of these portions may be formed to have an arc-like shape or a wavy shape. Also in this case, the arm portion 22 can also be increased in length and rigidity, and the same effect as described above can be obtained.

Further, the example in which the abrasion detector 10 (10a) shown in FIG. 2 and the like is attached to the back plate 16 by using the elastic clip 26 straddling the first surface 16a and the second surface 16b of the back plate 16 has been described. However, the present invention is not limited to this, for example, the attachment portion 20 may be directly fixed to the first surface 16a. For example, the attachment portion 20 may be fixed to the first surface 16a by using fastening members such as rivets or bolts. In this case, the portion corresponding to the elastic clip 26 can be omitted, the shape of the abrasion detector 10 becomes simple to make it possible to contribute to a reduction in number of steps and a reduction in material when the abrasion detector 10 is formed by bending.

This embodiment describes the example in which the arm portion 22 is extended in the longitudinal direction (Y-axis direction) of the abrasion detector 10. However, the arm portion 22 may be extended in a direction of height (Z-axis direction) of the abrasion detector 10, and the same effect as in the embodiment can be obtained.

In addition, the number of times of bending of the arm portion 22 described in this embodiment can be selected according to the magnitude and tone of warning sound to be generated, and may be larger or smaller than the number shown in FIG. 2 and the like. Further, the arm portion 22 may be adjusted or the material of the abrasion detector 10 (10a) may be selected such that the magnitude or tone of the warning sound is changed for every brake pad 12. For example, the tones or magnitudes of the warning sound may be made different between the brake pads 12 on the front wheel side and the brake pads 12 on the rear wheel side. Also, the tones or magnitudes may be different from each other on the inner side and the outer side. By employing such a configuration, even in the case in which the mechanical type (audible type) abrasion detector 10 is used, as in the case in which the electric abrasion detection sensor 38 is used, an abraded position can be specified to make it possible to contribute to improvement in performance.

Although the embodiment of the present invention has been exemplified above, the above embodiment is merely an example, and it is not intended to limit the scope of the invention. The above embodiment can be effected in various other forms, and various omissions, substitutions, combinations, and changes thereof can be made without departing from the scope of the invention. Further, the invention can be performed by appropriately changing the specifications (structure, type, direction, shape, size, length, width, thickness, height, number, arrangement, position, material, etc.) of each configuration and shape. In addition, partial replacement of the configurations among a plurality of embodiments can be performed.

The invention claimed is:

1. A brake pad abrasion detector for a brake pad comprising a lining configured to be brought into contact with a sliding surface of a disc rotor, and a back plate having a first side surface to which the lining is fixed, a second side surface opposite to the first side surface so that the lining is located on a first side surface side of the back plate, the first side surface facing a first direction and the second side surface facing a second direction opposite the first direction, and an outer peripheral surface connecting the first side surface and the second side surface and facing a third direction different from the first direction and the second direction, the brake pad abrasion detector comprising:
   an attachment portion which is a plate-shaped portion having a first surface configured to be in contact with the first side surface and a second surface opposite to the first surface;
   a nipping portion configured to be in contact with the second side surface;
   a connecting portion connecting the attachment portion and the nipping portion and configured to be in direct contact with the outer peripheral surface of the back plate;
   an arm portion configured to project from the attachment portion in the first direction, the arm portion configured to be bent onto the first side surface side of the back plate; and
   a contact portion disposed on the arm portion at a position configured to be contacted by the disc rotor when the lining is abraded, wherein
   the arm portion has a first extending portion configured to extend in a direction opposite to the contact portion along the first side surface,
   the arm portion has a second extending portion disposed at a folded end portion of the first extending portion and configured to extend in the first direction,
   the arm portion has a third extending portion disposed at a folded end portion of the second extending portion and extends a direction toward the contact portion,
   the arm portion has a fourth extending portion which is disposed at a folded end portion of the third extending portion, is configured to contact the first side surface, and has a fold in a direction toward the contact portion.

2. The brake pad abrasion detector according to claim 1, wherein the arm portion is configured to be located radially outward of an outer circumference of the disc rotor.

3. The brake pad abrasion detector according to claim 1, wherein the contact portion is configured to extend in an inner radial direction of the disc rotor.

4. The brake pad abrasion detector according to claim 1, wherein the nipping portion has an elastic engagement portion configured to be engaged with an engaged portion of the back plate.

\* \* \* \* \*